United States Patent [19]

Sugiyama

[11] Patent Number: 4,697,257
[45] Date of Patent: Sep. 29, 1987

[54] JITTER COMPENSATION SYSTEM IN A ROTARY RECORDING MEDIUM REPRODUCING APPARATUS

[75] Inventor: Hiroyuki Sugiyama, Isehara, Japan

[73] Assignee: Victor Company of Japan, Ltd., Yokohama, Japan

[21] Appl. No.: 757,922

[22] Filed: Jul. 26, 1985

Related U.S. Application Data

[63] Continuation of Ser. No. 396,552, Jul. 9, 1982, abandoned.

[30] Foreign Application Priority Data

Jul. 14, 1981 [JP] Japan .................. 56-109564

[51] Int. Cl.$^4$ ................................... G11B 21/02
[52] U.S. Cl. ........................ 369/43; 358/321; 358/342
[58] Field of Search ............... 369/43, 44, 46; 358/342, 320–324, 337; 360/36.1, 10.1

[56] References Cited

U.S. PATENT DOCUMENTS

| | | | |
|---|---|---|---|
| 3,381,086 | 4/1968 | De Moss et al. | 369/46 |
| 3,596,064 | 7/1971 | Markevitch | 369/44 |
| 3,711,641 | 1/1973 | Palmer | 178/6.6 TC |
| 3,876,827 | 4/1975 | Janssen | 369/46 |
| 3,965,482 | 6/1976 | Burrus | 358/8 |
| 4,005,260 | 1/1977 | Janssen | 369/44 |
| 4,190,859 | 2/1980 | Kinjo | 358/342 X |
| 4,415,936 | 11/1983 | Sugiyama | 358/343 |
| 4,416,002 | 11/1983 | Oguino et al. | 358/342 X |
| 4,426,692 | 1/1984 | Hirata | 369/32 |
| 4,500,981 | 2/1985 | Sugiyama | 369/43 |
| 4,608,610 | 8/1986 | Tatsuguchi | 358/324 |

FOREIGN PATENT DOCUMENTS

| | | | |
|---|---|---|---|
| 52-024429 | 2/1977 | Japan | 358/321 |
| 52-053624 | 4/1977 | Japan | 358/321 |
| 54-034356 | 2/1980 | Japan | 358/321 |
| 1454901 | 11/1976 | United Kingdom . | |
| 1520004 | 8/1978 | United Kingdom . | |
| 2060214 | 4/1981 | United Kingdom . | |
| 2086089 | 5/1982 | United Kingdom . | |
| 2086091 | 5/1982 | United Kingdom . | |
| 2090024 | 6/1982 | United Kingdom . | |
| 2102161 | 1/1983 | United Kingdom . | |

*Primary Examiner*—Aristotelis M. Psitos
*Attorney, Agent, or Firm*—Ladas & Parry

[57] ABSTRACT

A jitter compensation system is applied to a rotary recording medium reproducing apparatus having a reproducing transducer including a reproducing element for reproducing recorded signals from a rotary recording medium, where the rotary recording medium is recorded with an information signal track and also recorded with reference signals for tracking control having predetermined frequencies. The jitter compensation system comprises a separating circuit for separating the reference signals from a signal reproduced by the reproducing transducer, a detecting circuit for frequency-detecting frequencies of the separated reference signals, to produce a jitter compensation signal, and a displacing circuit responsive to the output jitter compensation signal of the detecting circuit, for displacing the reproducing element of the reproducing transducer along a relative scanning direction with respect to the rotary recording medium.

3 Claims, 10 Drawing Figures

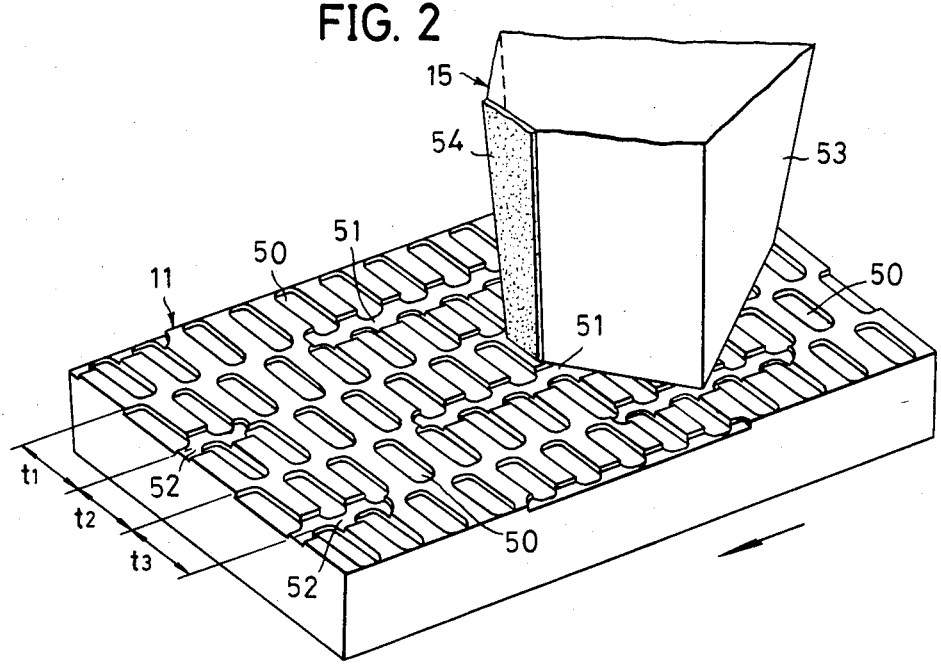
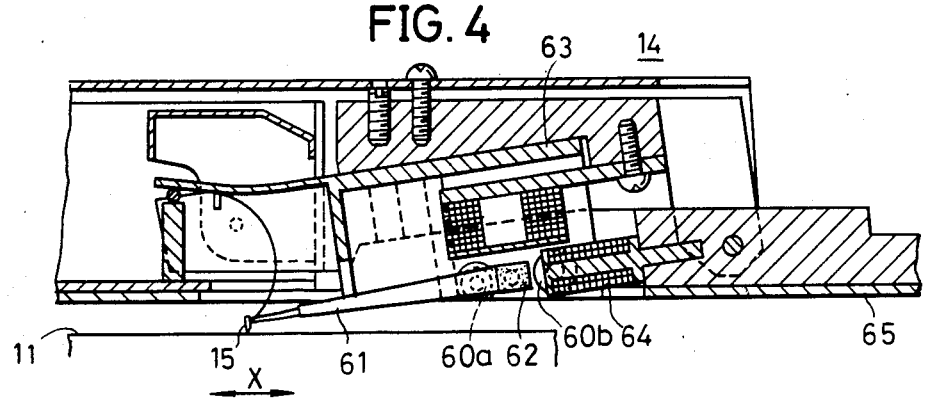

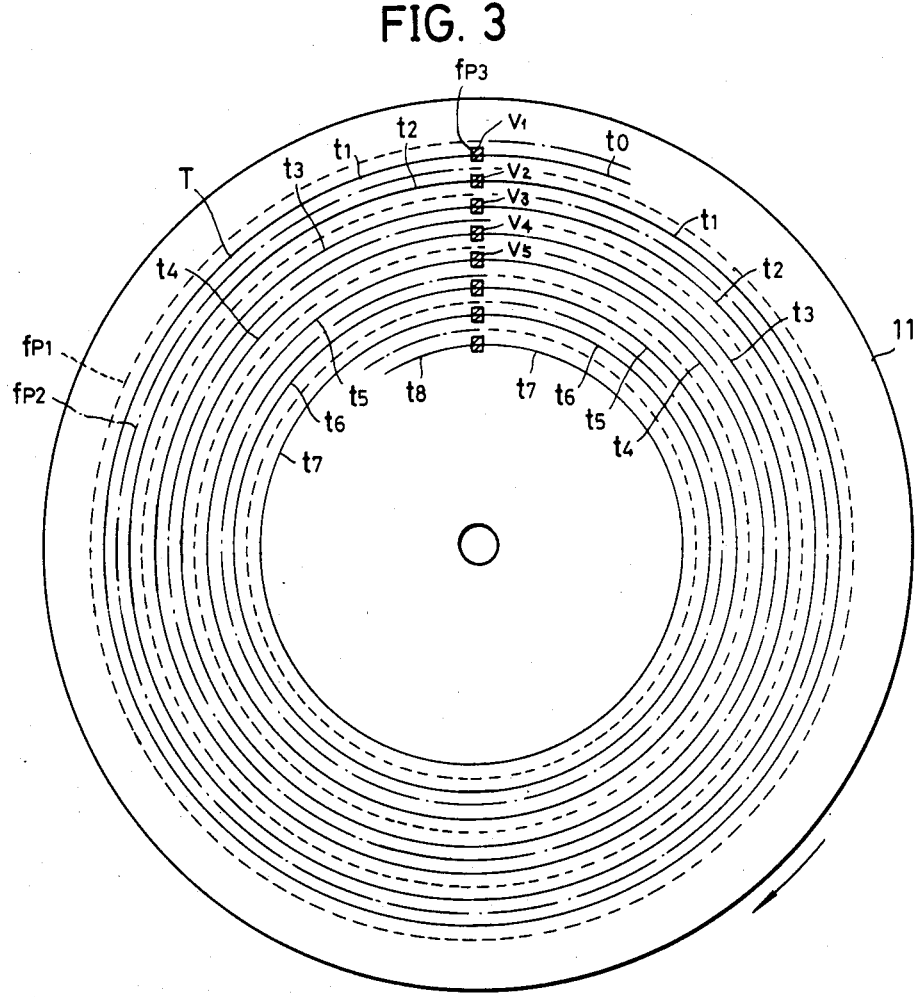

JITTER COMPENSATION SYSTEM IN A ROTARY RECORDING MEDIUM REPRODUCING APPARATUS

This is a continuation of copending application Ser. No. 396,552 filed on Jul. 9, 1982, now abandoned.

BACKGROUND OF THE INVENTION

The present invention generally relates to jitter compensation systems in rotary recording medium reproducing apparatuses, and more particularly to a jitter compensation system capable of performing jitter compensation by use of reference signals for tracking control which are reproduced from a rotary recording medium, in a rotary recording medium reproducing apparatus.

A new information signal recording and/or reproducing system has been proposed in U.S. Pat. No. 4,315,283 and No. 4,322,836, of which the assignee is the same as that of the present application. According to this proposed system, the recording system forms pits in accordance with an information signal being recorded along a spiral track on a flat rotary recording medium (hereinafter simply referred to as a disc), without forming a groove therein. In the reproducing system, a reproducing stylus traces over along this track to reproduce the recorded information signal in response to variations in electrostatic capacitance.

In the system, since no grooves for guiding the reproducing stylus are provided on the disc, it becomes necessary to record pilot or reference signals on or in the vicinity of a track of a program information signal, on the disc. Upon reproduction, the reference signals are reproduced together with the program information signal. Tracking control is carried out so that the reproducing stylus accurately traces along the track in response to the reproduced reference signals.

By use of this previously proposed system, there is no possibility whatsoever of the reproducing stylus or the disc being damaged since the recording track has no groove. The reproducing stylus can trace the same portion of the track repeatedly many times, whereby a special reproduction such as still, slow motion, or quick motion reproduction becomes possible in a case where the recorded information signal is a video signal. Moreover, operations such as a random access, highspeed search, and automatic cueing operation in which the reproducing stylus is shifted to a position of a desired recorded program where the reproduction is to be started, can be performed with ease.

However, in the reproducing apparatus, when irregularity (wow and flutter) exists in the rotation of the turntable which is placed with the disc to rotate the disc, eccentricity exists in the center hole of the disc, distortion is introduced in the disc upon molding of the disc, and the like, jitter (error in the time base) is introduced in the reproduced signal. The above jitter covers a frequency range from a relatively low frequency component corresponding to the rotational period of the disc due to such causes as the above irregular rotation and eccentric center hole, to as the above distortion in the disc, mainly, a few hundred Hz to 1.5 kHz.

In a case where the reproduced information signal is a color video signal, the above jitter gives rise to color shading, swinging of picture image in the reproduced picture of the receiver, and the quality of the reproduced picture greatly deteriorates.

There exists a conventional jitter compensation system in which the horizontal synchronizing signal is separated from a video signal reproduced from the disc by a reproducing transducer. In this system, the phase of the separated horizontal synchronizing signal is compared with that of a reference signal, and the jitter compensation is performed by displacing a reproducing element of the reproducing transducer along a relative scanning direction with respect to the disc in response to an output phase error signal obtained as a result of the phase comparison.

However, because the conventional jitter compensation system uses the horizontal synchronizing signal separated from the reproduced video signal, there is a disadvantage in that the system can only be applied to a reproducing apparatus for reproducing discs recorded with video signals.

On the other hand, in a case where the disc is recorded with a PMC audio signal as the information signal, the above conventional jitter compensation system cannot be employed because the horizontal synchronizing signal does not exist within the reproduced signal.

The PCM audio signal is normally recorded and reproduced by use of an interleaving system and a deinterleaving system. That is, in the recording system, an input analog signal is sampled for every appropriate time period in a sample-and-hold circuit, and the resulting sampled signal is converted into a modulated digital signal in an analog-to-digital (A/D) converter. This modulated digital signal is fed into a memory in which data write-in and read-out operations are controlled by a control pulse, and a series of word groups are arranged where the words obtained for every one sample of the digital signal respectively interleave with each other in a state separated from each other by a period of 10-odd H (H denotes one horizontal synchronizing period). Here, "one word" refers to the combination of bits obtained from one sample. The time period represented by 10-odd H, is determined in conformance with the format used.

A composite synchronizing signal is added to the signal thus obtained to produce a composite digital signal, which is then recorded on a magnetic tabe by a VTR. This rearrangement of the order of data is referred to as "interleaving". Since the interleaving of data results in the distribution of the signal information, even when the recorded or reproduced signal is deficient over one or more horizontal scanning (H) periods due to dropout, the associated signal present in the separate horizontal scanning period serves to reproduce the information.

A data part is extracted from the signal reproduced from the disc. This data part, which undergoes waveshaping, is then converted into a binary coded digital signal, and thereafter supplied to a memory where the signal is written in and read out responsive to a control pulse and restored back into the original order. This restoring of the signal back into the original order, is called de-interleaving. The resulting signal is supplied to a digital-to-analog (D/A) converter where it is restored back into the original analog signal.

Conventionally, because the conventional jitter compensation system cannot be used for the above described reasons, when the above de-interleaving is performed in the reproducing system, the information signal which is reproduced in a state including the jitter component is written into a memory by de-interleaving with a constant clock signal. The information signal is read out from the above memory in the regular order by eliminating the jitter component. There fore, there was a disadvantage in that the memory needed a capacity obtained by adding the capacity for the jitter component to the capacity required to store the reproduced signal into the memory by de-interleaving.

Accordingly, a jitter compensation system was proposed in a United States Patent Application entitled "JITTER COMPENSATION SYSTEM IN A ROTARY RECORDING MEDIUM REPRODUCING APPARATUS" of which the assignee is the same as that of the present application. In this proposed system, reference signals recorded on the disc in a bursted manner with a predetermined period are reproduced, and a jitter compensation signal is obtained by comparing the phase of the reproduced reference signals and the phase of a standard signal having the same period as the above predetermined period, to perform jitter compensation by this jitter compensation signal. However, this system does not detect the period or frequency of the reference signals, but detects the period with which the reference signal is recorded in a bursted manner. Therefore, some problems are introduced in an attempt to obtain a jitter compensation signal having high signal-to-noise (S/N) ratio.

SUMMARY OF THE INVENTION

Accordingly it is a general object of the present invention to provide a novel and useful jitter compensation system in a rotary recording medium reproducing apparatus, in which the above described problems and disadvantages have been eliminated.

Another and more specific object of the present invention is to provide a jitter compensation system in a rotary recording medium reproducing apparatus, in which the frequency of reference signals, for controlling tracking of a reproducing element, reproduced from a rotary recording medium, is frequency-detected to obtain a jitter compensation signal for performing jitter compensation. A phase locked loop is used for performing the above frequency detection. According to the system of the present invention, the number of times detection is performed for one revolution of the rotary recording medium is large, because the frequency of the reproduced reference signals are frequency-detected. Hence, the S/N ratio of the jitter compensation signal becomes high, to enable jitter compensation of high accuracy.

Still another object of the present invention is to provide a jitter compensation system in a rotary recording medium, in which a tracking control signal is obtained by detecting synchronism of the reproduced reference signals by use of a signal from the above phase locked loop, in addition to obtaining the jitter compensation signal in the above described manner.

Other objects and further features of the present invention will be apparent from the following detailed description when read in conjunction with the accompanying drawings.

BRIEF DESCRIPTION OF THE DRAWINGS

FIG. 2 is a perspective view, in an enlarged scale, showing a part of a rotary recording medium together with a tip end part of a reproducing stylus;

FIG. 3 shows a pattern on the rotary recording medium;

FIG. 4 is a side view, in cross section, showing an example of a reproducing transducer provided with a jitter compensation mechanism.

DETAILED DESCRIPTION

Figure 1:
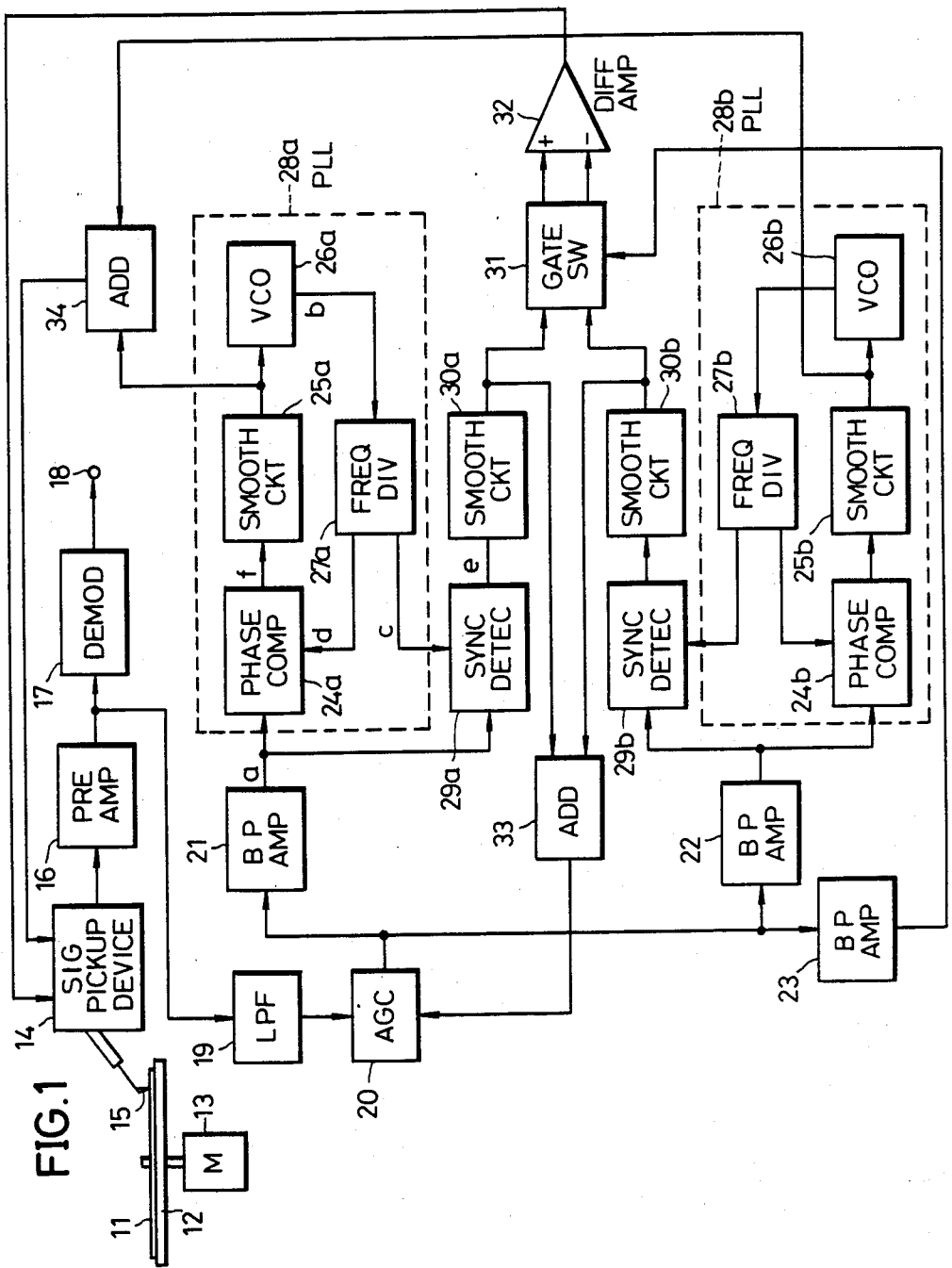
FIG. 1 is a system block diagram showing a rotary recording medium reproducing apparatus including an embodiment of a jitter compensation system according to the present invention.

In FIG. 1, a rotary recording medium (hereinafter simply referred to as a disc) 11 is placed onto a turntable 12, and rotated by a motor 13 at a rotational speed of 900 rpm, for example. A signal pickup device 14, used as a reproducing transducer, has a reproducing stylus 15, and moves continuously and linearly in a direction from the outer peripheral part to the inner peripheral part at a speed equal to the distance of one track pitch per revolution of the turntable 12, during a forward normal reproduction mode. Accordingly, the stylus 15 of the signal pickup device 14 travels radially across the rotating disc 11 and relatively traces the spiral track of the disc 11.

A main information signal comprising a video signal and an audio signal is recorded on a spiral track with pits formed on the disc 11 according to the information contents of the signal. One part of this track is shown in an enlarged scale in FIG.2. In FIG. 2, track turns of a single continuous spiral track, corresponding to each revolution of the disc 11, are designated by t1, t2, t3, ... . Each track turn is constituted by the formation of pits 50 of a main information signal along a plane track path and has no stylus guide groove formed therein. With respect to one track 51, for every interval corresponding to one horizontal scanning period (H) of the video signal, that is, with a frequency interval $f_H'$ pits 51 of a first reference signal fp1 are formed on one lateral side of the track as viewed in the track path direction. Pits 52 of a second reference signal fp2 are formed on the other side of the track.

For example, the frequency $f_H$ is 15.75 kHz, the frequency of the first reference signal fp1 is approximately 511 kHz, and the frequency of the second reference signal fp2 is approximately 716 kHz. These first and second reference signals fp1 and fp2 are originally for tracking control, but in the present invention, these reference signals fp1 and fp2 are also used for obtaining a jitter compensation signal.

At an intermediate position between the centerlines of adjacent track turns, only pits of either one kind of the pits 51 and 52 of the above reference signals fp1 and fp2 are formed, and moreover, with respect to one track, the sides on which the pits 51 and 52 are formed and alternated for every track turn. That is, if the pits 51 and 52 are respectively formed on the right and left sides of one track turn, for example, the pits 52 and 51 will respectively be formed on the right and left sides of each of the adjacent track turns.

The tip end of the reproducing stylus 15 has a shape shown in FIG. 2. The reproducing stylus 15 is constituted by a stylus structure 53 having a disc tracing surface which has a width greater than a track width, and an electrode 54 fixed to the rear face of the stylus structure 53. As the reproducing stylus 15 traces along a track on the disc 11 rotating in a direction indicated by an arrow, the main information signal recorded thereon by the formation of pits is reproduced as variations in the electrostatic capacitance between the surface of the disc 11 and the electrode 54 of the reproducing stylus 15.

On the disc 11, as indicated in FIG. 3, the main information signal is recorded along a spiral track T. In FIG. 3, the tracks of the first reference signal fp1 is shown by dotted lines while the second reference signal fp2 is shown by one-dot chain lines. The successive track parts corresponding to one revolution of the disc of a single spiral track T is designated by track turns t1, t2, t3, . . . Furthermore, a third reference signal fp3 is recorded at the starting end positions V1, V2, V3, . . . of each of the track turns t1, t2, t3, . . . , that is, at positions where the reference signals fp1 and fp2 change over.

In the system shown in FIG. 1, a reproduced signal picked up from the disc 11 as minute variations in the electrostatic capacitance by the reproducing stylus 15 of the signal pickup device 14, is supplied to a preamplifier 16 having a resonant circuit. The resonance frequency of the resonant circuit varies in response to this variation in the electrostatic capacitance, and is formed into a signal of a desired level. The resulting output of the preamplifier 16, is demodulated into the original main information signal by demodular 17 and is obtained as an output through an output terminal 18.

The output signal of the preamplifier 16 is supplied to a lowpass filter 19 wherein the reference signals fp1, fp2, and fp3 are separated. The output reference signals pass through an automatic gain control (AGC) circuit 20, and are respectively supplied to amplifiers 21, 22, and 23. Here, each of the amplifiers 21, 22, and 23 is a kind of a bandpass amplifier respectively designed to have steep passing frequency characteristics at only the respective frequency fp1, fp2, and fp3. As a result, the signals having frequencies fp1, fp2, and fp3 are respectively separated and obtained from the amplifiers 21, 22, and 23.

Figure 5:
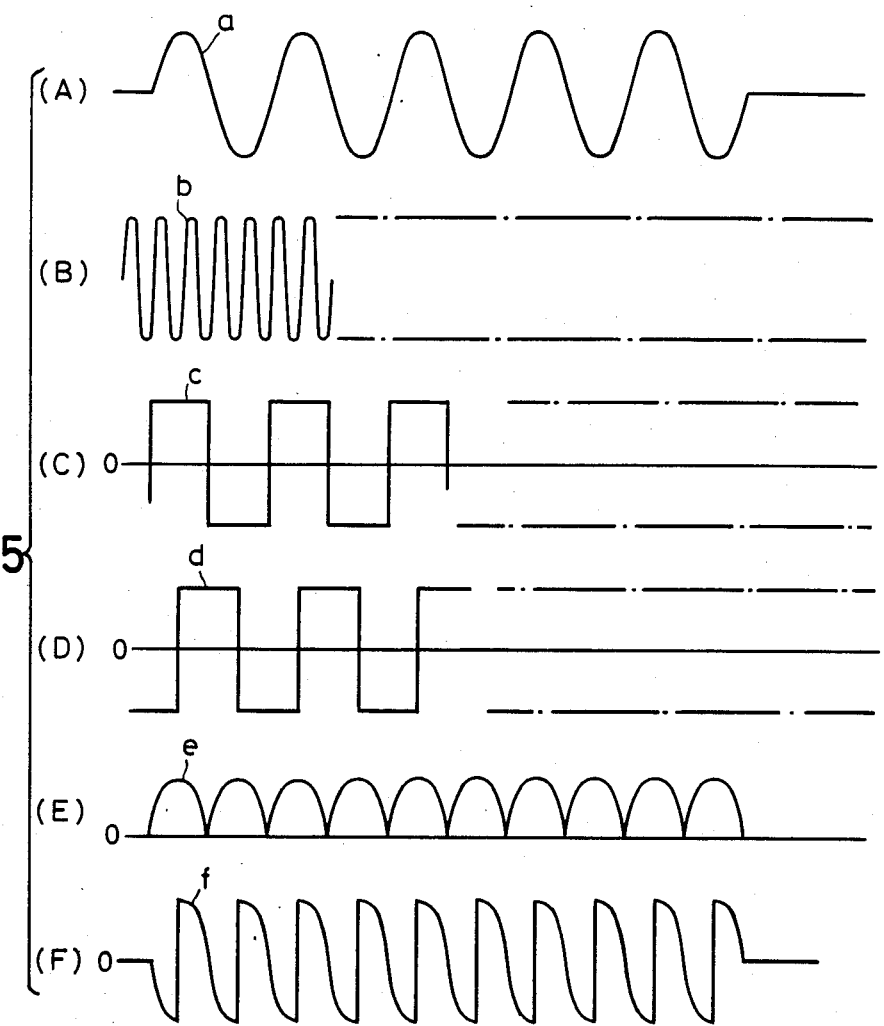
FIGS. 5(A) through 5(F) are graphs respectively showing signal waveforms at each part of the block system shown in FIG. 1.

The first reference signal fp1 having a waveform a shown in FIG. 5(A) is obtained from the amplifier 21, and supplied to a phase comparator 24a. The phase of the first reference signal fp1 is thus compared with the phase of a signal d shown in FIG. 5(D) which is obtained from a ¼ frequency divider 27a. An output signal f shown in FIG. 5 (F) of the phase comparator 24a is smoothened at a smoothing circuit 25a. A smoothened output signal of the smoothing circuit 25a is applied to a voltage controlled oscillator (VCO) 26a, to control the oscillation frequency of this VCO 26a. An oscillation output b shown in FIG. 5(B) of the VCO 26a, has a frequency which is four times the frequency of the first reference signal fp1. The frequency of the above oscillation output b is frequency-divided into ¼ the original frequency at the ¼-frequency divider 27a. An output signal d of the ¼-frequency divider 27a is supplied to the above phase comparator 24a. The phase comparator 24a, smoothing circuit 25a, VCO 26a, and frequency divider 27a constitute a phase locked loop (PLL) 28a. The smoothing circuit 25a may be included within the phase comparator 24a. Here, the oscillation frequency of the VCO 26a is set to 4 fp1, to obtain the frequency fp1 by frequency-dividing the oscillation frequency 4 fp1 at the frequency divider 27a. This is in order to obtain the square wave signal d which lags (or leads) the first reference signal fp1 by 90° in phase, and to obtain a signal c shown in FIG. 5(C) of the same phase (or inverted phase) as the first reference signal fp1. The signal c will be described hereinafter.

The output of the smoothing circuit 25a is supplied to the VCO 26a and to the adder 34. If the reference signal fp1 (a) does not include a jitter component, the time (duration) corresponding to the positive polarity portion of the output error signal f obtained from the phase comparator 24a, is equal to the duration corresponding to the negative polarity portion of the output error signal f. On the other hand, when the reference signal fp1 includes a jitter component, the durations corresponding to the positive and negative polarity portions of the above output error signal f become different. Hence, the output signal of the smoothing circuit 25a is in accordance with the jitter component. The oscillation frequency of the VCO 26a is controlled by the output of the smoothing circuit 25a in a direction so that the jitter component becomes zero. In addition because the output signal of the smoothing circuit 25a supplied to the adder 34 is a signal in correspondence with the jitter component, this output signal of the smoothing circuit 25a is used for jitter compensation.

The second reference signal fp2 obtained from the amplifier 22, is supplied to a phase comparator 24b within a PLL 28b. The operations of the PLL 28b, and the phase comparator 24b, smoothing circuit 25b, VCO 26b, and ¼-frequency divider 27b which constitute the PLL 28b, are the same as the operations of the above described PLL 28a, and the phase comparator 24a, smoothing circuit 25a, VCO 26a, ¼-frequency divider 27a which constituted the PLL 28a, and descriptions thereof will be omitted. A signal in correspondence with the jitter component, which is obtained from the smoothing circuit 25b, is supplied to the adder 34.

The respective frequencies of the reference signal fp1 and fp2 are frequency-detected at the PLL 28a and 28b, and the signals obtained from the smoothing circuits 25a and 25b are respectively added at the adder 24. The added signal is applied to the signal pickup device 14 as the jitter compensation signal. An example of the signal pickup device 14 is shown in cross section in FIG. 4.

In the signal pickup device 14 shown in FIG. 4, the reproducing stylus 15 is fixed at the tip end of a cantilever 61. The cantilever 61 is fitted and provided with a permanent magnet 62 at the rear end thereof. Coils 60a and 60b for tracking are respectively provided on the front and rear (left and right in FIG. 4) of the permanent magnet 62. The rear end part of the cantilever 61 is supported at a lower part of a pickup cartridge frame 63 by a resilient support member (not shown). A coil 64 for jitter compensation is provided at the rear along an axial line of the cantilever 61. The signal pickup device 14 is provided on a carriage 65, and the reproducing stylus 15 is transferred along the radial direction of the disc 11 when the carriage 65 is transferred. The jitter compensation signal from the above adder 34 is applied to the jitter compensation coil 64. Accordingly, the cantilever 61 is displaced along the longitudinal direction thereof, that is, along the relative tracing direction on the disc 11. The cantilever 61 is thus displaced so that jitter is not introduced along the directions indicated by an arrow X, to perform jitter compensation.

The system according to the present invention does not detect the period (the frequency $f_H$ equals 15.75 kHz) of the reference signals recorded in a bursted manner. In the system of the present invention, the jitter compensation signal is obtained by frequency-detecting the frequencies (511 kHz and 716 kHz) of the reference signals fp1 and fp2. Because the jitter compensation signal thus obtained is used to perform the jitter compensation, high S/N ratio can be obtained, and the jitter compensation can be performed with high accuracy.

In the present embodiment, the frequencies of the first and second reference signals fp1 and fp2 are respectively frequency-detected, and the jitter compensation signal is obtained by adding the resulting output error signlas of the frequency detection. However, the jitter compensation signal may be obtained by frequency-detecting only the first reference signal fp1 or the second reference signal fp2. But, a jitter compensation signal of higher S/N ratio can be obtained according to the present embodiment, because the effect due to noise becomes relatively small.

On the other hand, the first reference signal fp1 obtained from the amplifier 21, is also supplied to a synchronous AM detector 29a wherein synchronous detection is made by the square wave signal c shown in FIG. 5(C) obtained from the ¼-frequency divider 27a of the PLL 28a. A synchronous detection output from the synchronous AM detector 29a, is a full-wave rectified signal e shown in FIG. 5(E). This signal e is smoothened in a smoothing circuit 30a, and then supplied to a gate switcher 31 and an adder 33. Here, the amplitude of the signal e corresponds to the deviation (tracking error) quantity of the reproducing stylus 15 with respect to the track. Similarl, the second reference signal fp2 from the amplifier 22 is subjected to synchronous detection at a synchronous AM detector 29b, and an output signal of a smoothing circuit 30b is supplied to the gate switcher 31 and the adder 33.

The signals from the smoothing circuits 30a and 30b are alternately switched at the gate switcher 31 for one revolution of the disc 11 according to the third reference signal fp3 obtained from the amplifier 23, and supplied to a non-inverting input terminal and an inverting input terminal of a differential amplifier 32. A tracking control signal is thus obtained from the differential amplifier 32, and applied to the tracking coils 60a and 60b of the signal pickup device 14. The reproducing stylus is accordingly controlled in its tracking.

In order to perform the synchronous detection of the reference signals fp1 and fp2 at the synchronous AM detectors 29a and 29b, the output signals of the frequency dividers 27a and 27b of the PLL 28a and 28b, having the same phases as the reference signals fp1 and fp2 (or having inverted phases with respect to the reference signals fp1 and fp2), are used. Hence, event if noise components having frequencies substantially equal to the reference signals fp1 and fp2 are included within these reference signals fp1 and fp2, the system is not affected by these noise components. Moreover, there is no effect due to spike noise. Accordingly, compared to a system in which the tracking control signal is obtained by simply detecting the amplitudes of the reference signals fp1 and fp2, a tracking control having superior S/N ratio can be obtained according to the present invention.

The output signals of the smoothing circuits 30a and 30b are supplied to the adder 33 and added therein, and an added output signal is applied to the AGC circuit 20. Thus, automatic gain control is performed so that the sum of the tracking control signal due to the reference signal fp1 and the tracking reference signal due to the reference signal fp2 becomes constat. Therefore, even if the width of the electrode becomes wide due to fairly long use of the reproducing stylus 15, for example, there is no difference in the level variation of the reproduced reference signals at between the initial state of use and after the long use of the reproducing stylus 15, and the tracking control signal can always be obtained with good stability.

Because the reference signals are recorded in a bursted manner with the frequency $f_H$ as described above, the above jitter compensation signal and the tracking control signal are also obtained in a bursted manner. However, since the period ($1/f_H$) with which the jitter compensation signal and the tracking control signal are obtained in the bursted manner is small, the jitter compensation operation and the tracking control operation can be performed without difficulty. In order to continuously obtain the jitter compensation signal and the tracking control signal, a time constant circuit may be provided between the smoothing circuits 25a and 25b and the adder 34, and between the smoothing circuits 27a and 27b and the gate switcher 31.

During a high-speed search mode, the reproducing stylus is fed to a set address at a high speed in a state where the tracking control is not performed with respect to the reproducing stylus. Here, the reference signals can be finely reproduced even if the tracking control is not performed (that is, the reference signals can be reproduced in a better state when the tracking control is not performed). Hence, even during the high-speed search mode, the jitter compensation operation is performed by the jitter compensation signal obtained from the reproduced reference signals. The address recorded on the track can be detected more positively and the high-speed search operation to the set address can be performed positively, if no jitter exists upon high-speed search mode. Moreover, by performing jitter compensation also during the high-speed search mode, a fine reproduced picture can be obtained immediately when tracking is obtained as the reproducing stylus reaches the set address.

Further, the present invention is not limited to these embodiments, but various variations and modifications may be made without departing from the scope of the present invention.

What is claimed is:

1. A jitter compensation system in a rotary recording medium reproducing apparatus having a reproducing transducer including a reproducing element for reproducing recorded signals from a rotary recording medium, said rotary recording medium being recorded with an information signal on a track thereof and also recorded with first and second reference signals for tracking control respectively having predetermined frequencies which are mutually different, said first and second reference signals being switched over and alternately recorded between track turns for every information signal recording track turn on said rotary recording medium, and a third reference signal for indicating switching over positions of said first and second reference signals; said first and second reference signals being recorded in a burst manner with a specific repetition frequency, said jitter compensation system comprising:

separating means for separating said first, second and third reference signals from a signal reproduced by said reproducing transducer, said reproduced first and second reference signals each including a frequency deviation component within a burst period thereof, said frequency deviation component being a frequency deviation from the respective predetermined frequencies of said first and second reference signals and corresponding to a jitter component in the signal reproduced by said reproducing transducer;

detecting means directly responsive to the separated first and second reference signals from said separating means for frequency-detecting frequencies of said separated first and second reference signals and for producing a jitter compensation signal, said detecting means comprising first detecting means for detecting the frequency of said first reference signal and second detecting means for detecting the frequency of said second reference signal, said first detecting means comprising a first phase locked loop including first phase comparing means supplied with said separated first reference signal, and first oscillator means controlled of its oscillation frequency according to an output signal of said first phase comparing means for supplying a frequency substantially equal to the frequency of said first reference signal to said first phase comparing means, said second detecting means comprising a second phase locked loop including second phase comparing means supplied with said separated second reference signal, and second oscillator means controlled in its oscillation frequency according to an output signal of said second phase comparing means for supplying a frequency substantially equal to the frequency of said second reference signal to said second phase comparing means, said first and second oscillator means respectively comprising first and second voltage controlled oscillators for producing frequencies n (n is an integer) times the frequencies of said respective first and second reference signals, and first and second frequency dividers for frequency-dividing respective outputs of said first and second voltage controlled oscillators into 1/n the original frequencies and supplying frequency-divided output to said first and second phase comparing means;

displacing means responsive to the output jitter compensation signal of said detecting means for displacing the reproducing element of said reproducing transducer along a relative scanning direction with respect to said rotary recording medium;

adding means for adding output signals of said first and second phase comparing means and applying the added signal to said displacing means as the jitter compensation signal;

first and second synchronous detecting means respectively supplied with said separated first and second reference signals for subjecting these first and second reference signals to synchronous detection by respective signals from said first and second frequency dividers;

means for switching outputs of said first and second synchronous detecting means by said separated third reference signal to obtain a tracking control signal; and means supplied with said tracking control signal for controlling the reproducing element of said reproducing transducer so as to scan over the tracks on said rotary recording medium.

2. A jitter compensation system as claimed in claim 1 in which each of said first and second phase comparing means comprises a phase comparator supplied with a corresponding one of said separated first and second reference signals, and a smoothing circuit for smoothing an output of said comparator.

3. A jitter compensation system as claimed in claim 1 in which said first and second voltage controlled oscillators produce frequencies four times the frequencies of said first and second reference signals, respectively, and said first and second frequency dividers frequency-divide the outptus of said first and second voltage controlled oscillators into ¼ the original frequencies, respectively.

* * * * *